United States Patent [19]

Herzig et al.

[11] Patent Number: 5,446,119
[45] Date of Patent: Aug. 29, 1995

[54] ORGANOPOLYSILOXANES CONTAINING ESTER GROUPS

[75] Inventors: Christian Herzig, Taching am See; Willibald Burger; Bernward Deubzer, both of Burghausen; Martina Bloechl, Tann, all of Germany

[73] Assignee: Wacker-Chemie GmbH, Munich, Germany

[21] Appl. No.: 279,382

[22] Filed: Jul. 25, 1994

[30] Foreign Application Priority Data

Jul. 28, 1993 [DE] Germany .................... 43 25 359.8

[51] Int. Cl.[6] .................................... C08G 77/16
[52] U.S. Cl. ................................ 528/26; 528/31; 528/29; 528/27; 556/440; 556/445; 252/321; 95/241; 95/242
[58] Field of Search ............... 528/26, 31, 29, 27; 556/440, 445

[56] References Cited

U.S. PATENT DOCUMENTS

| 4,613,641 | 9/1986 | Haukennestel et al. | 524/267 |
|---|---|---|---|
| 4,985,511 | 1/1991 | Wagener et al. | 525/474 |
| 5,151,473 | 9/1992 | Herzig | 525/474 |
| 5,214,007 | 5/1993 | Herzig et al. | 522/99 |
| 5,214,077 | 5/1993 | Herzig et al. | 522/99 |
| 5,250,647 | 10/1993 | Herzig | 528/15 |

FOREIGN PATENT DOCUMENTS

| 2091584 | 4/1992 | Canada. |
| 0473812 | 3/1992 | European Pat. Off.. |
| 0508491 | 10/1992 | European Pat. Off.. |
| 3427208 | 6/1986 | Germany. |
| 4011942 | 10/1990 | Germany. |
| 3940536 | 6/1991 | Germany. |
| WO92/05854 | 4/1992 | WIPO. |

OTHER PUBLICATIONS

English Derwent abstract corresponding to DE 40 11 942.
Polym. Prepr., Am. Chem. Soc., Div. Polym. Chem. 26 (1985), Nr. 1 S. 251-252 by J. S. Riffle et al.

Primary Examiner—John C. Bleutge
Assistant Examiner—Margaret W. Glass
Attorney, Agent, or Firm—Martin Connaughton

[57] ABSTRACT

Organopolysiloxanes which contain ester groups and comprise units of the formula $$R_a A_b SiO_{\frac{4-a-b}{2}}, \quad (I)$$

in which
R may be an identical or different monovalent, SiC-bonded hydrocarbon radical having 1 to 18 carbon atoms,
A may be an identical or different radical of the formula

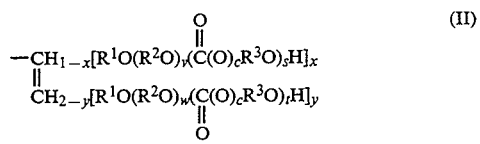

in which
$R^1$, $R^2$, $R^3$, c, v, w, s, t,
is 0 or an integer, the sum of s and t being an integer from 1 to 20,
x is 0 or 1,
y is 0 or 1, the sum of x and y being 1 or 2,
a is 0, 1, 2 or 3, and
b is 0, 1 or 2,
with the proviso that the sum of a and b is less than or equal to 3 and the organopolysiloxane contains at least one radical A per molecule.

4 Claims, No Drawings

ORGANOPOLYSILOXANES CONTAINING ESTER GROUPS

FIELD OF INVENTION

The present invention relates to organopolysiloxanes which contain ester groups, to processes for their preparation and their use. The term organopolysiloxanes in this invention also includes oligomeric siloxanes.

BACKGROUND OF THE INVENTION

U.S. Pat. No. 4,613,641 (BYK-Chemie GmbH) and the corresponding DE 34 27 208 describe siloxanes which contain polyester groups as flow-promoting additives for coating materials and molding compositions, in which the polyester groups are bonded to the silicon atoms of the siloxane via divalent radicals and in which one siloxane unit may not have more than one polyester chain. U.S. Pat. No. 4,985,511 (University of Florida) describes carboxy-functional siloxanes onto which pivalolacetone is polymerized by ring-opening polymerization. In this polymerization, only side chains with acid or ester terminal groups are obtained. Furthermore, in Polym, Prepr., Am. Chem. Soc., Div. Polym, Chem. 26 (1985) No. 1, 251-2 (J. S. Riffle), ε-caprolactone is polymerized onto α,ω-bis(4-hydroxybutyl)-polydimethylsiloxane to produce block copolymers which are converted into polyurethanes.

SUMMARY OF INVENTION

The present invention relates to organopolysiloxanes which contain ester groups and comprise units of the formula $$R_a A_b SiO_{\frac{4-a-b}{2}}, \quad (I)$$

in which
R may be identical or different monovalent, SiC-bonded hydrocarbon radical having 1 to 18 carbon atoms,
A may be an identical or different radical of the formula

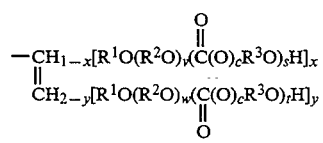
(II)

in which
$R^1$ may be an identical or different divalent hydrocarbon radical having 1 to 6 carbon atoms,
$R^2$ may be an identical or different divalent hydrocarbon radical having 2 to 4 carbon atoms,
$R^3$ may be an identical or different divalent hydrocarbon radical having 2 to 6 carbon atoms,
c is 0 or 1,
v is 0 or an integer,
w is 0 or an integer, the sum of v and w being 0 or an integer from 1 to 16,
s is 0 or an integer,
t is 0 or an integer, the sum of s and t being an integer from 1 to 20,
x is 0 or 1,
y is 0 or 1, the sum of x and y being 1 or 2,
a is 0, 1, 2 or 3, and
b is 0, 1 or 2,
with the proviso that the sum of a and b is less than or equal to 3 and the organopolysiloxane contains at least one radical A per molecule.

Examples of radical R are alkyl radicals such as the methyl, ethyl, n-propyl, iso-propyl, n-butyl, iso-butyl, tert-butyl, n-pentyl, isopentyl, neopentyl and tert-pentyl radical, hexyl radical, such as the n-hexyl radical, heptyl radicals such as the n-heptyl radical, octyl radicals such as the n-octyl radical and isooctyl radicals, such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; alkenyl radicals such as the vinyl and the allyl radical; cycloalkyl radicals such as cyclopentyl, cyclohexyl and cycloheptyl radicals and methylcyclohexyl radicals; aryl radicals such as the phenyl, napththyl, anthryl and phenanthryl radical; alkaryl radicals such as o-, m- and p-tolyl radicals, xylyl radicals and ethylphenyl radicals; and aralkyl radicals, such as the benzyl radical and the α- and β-phenylethyl radicals.

It is preferred at least 50%, more preferably 80%, of the number of radicals R in the organopolysiloxanes containing ester groups be methyl radicals.

Examples of radicals $R^1$ are radicals of the formula —CR'H— where R' is a hydrogen atom or monovalent organic radical, such as

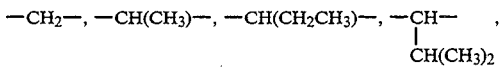

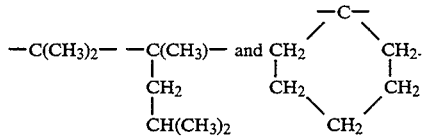

The radical $R^1$ is preferably the methylene and 1,1-ethylene radical, the methylene radical being more preferred.

Examples of radicals $R^2$ are radicals of the formula —CR"H—CH$_2$— where R" is a hydrogen atom or monovalent organic radical, such as 1,2-ethylene, 1,2-propylene and 1,2-butylene radicals, and the 1,3-propylene radical.

The radical $R^2$ is preferably the 1,2-ethylene radical and the 1,2-propylene radical.

Examples of radicals $R^3$ are the 1,2-ethylene, 1,3-propylene, 1,4-butylene, 1,5-pentylene and 2,2-dimethyl-1,3-propylene radicals.

The radical $R^3$ is preferably divalent linear hydrocarbon radicals having 2 to 6 carbon atoms, the 1,3-propylene and 1,5-pentylene radicals being particularly preferred.

c is preferably 0.

The sum of v and w is preferably 0 or an integer from 1 to 8, more preferably 0 or an integer from 1 to 4.

s and t are each preferably 0 or an integer from 1 to 6, 0 or an integer from 1 to 3 being more preferred.

The sum of s and t is preferably an integer from 1 to 10, more preferably an integer from 1 to 5.

The average value of a is preferably 1 to 2.5, more preferably 1.5 to 2.0.

The average value of b is preferably 0.04 to 1.0, more preferably 0.1 to 0.5.

The sum of x and y is preferably 2.

In units of formula (I) where b is other than 0, the sum of b is preferably 1.

Examples of radicals A of formula (II) are

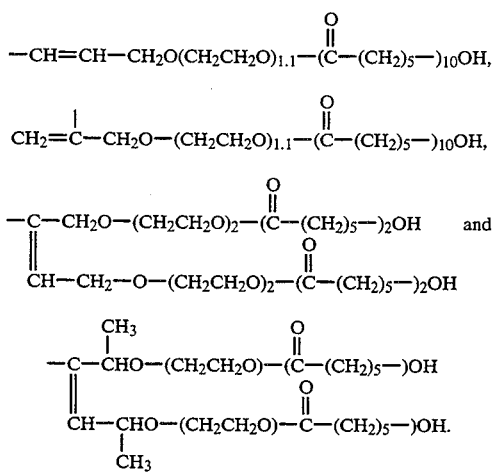

The organopolysiloxanes containing ester groups have a molecular weight of preferably from 500 to 100,000, the range 1,000 to 10,000 being more preferred.

Examples of the organopolysiloxanes containing ester groups are A-(SiMe$_2$O)$_{50}$SiMe$_2$-A, A-(SiMe$_2$O)$_{20}$-(SiMePhO)$_4$SiMe$_2$-A, [A-(SiMe$_2$O)$_{12}$]$_4$Si, [A-(SiMe$_2$O)$_{30}$]$_3$SiMe, A-(SiMe$_2$O)$_{60}$(ASiMeO)$_4$SiMe$_2$-A, A-SiMe$_2$O(ASiMeO)$_{10}$SiMe$_2$-A, (ASiMeO)$_4$, A (SiMe$_2$O)$_{50}$SiMe$_3$, Me$_3$SiO(SiMe$_2$O)$_{100}$(ASiMeO)$_5$SiMe$_3$ and Me$_3$SiO(ASiMeO)$_{10}$SiMe$_3$, A being as defined above, Me being the methyl radical and Ph being the phenyl radical.

The organopolysiloxanes containing ester groups have a viscosity at 25° C. of preferably from 10 to 1,000,000 mm$^2$/s. Depending on thier composition, they may have a waxy consistency ranging up to a pronounced solid character, with melting points of up to more than 100° C.

The invention relates to a process for the preparation of organopolysiloxanes which contain ester groups, which comprises reacting organic compound (1) of the formula

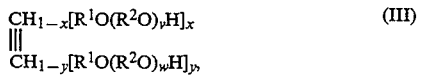

in which R$^1$ R$^2$ v w, x and y are as defined above with organopolysiloxane (2) comprising unit of the formula

in which R, a and b are as defined above, with the proviso that the sum of a+b is less than or equal to 3 and the siloxane molecule contains at least one Si-bonded hydrogen atom, with a cyclic ester (4) of the formula

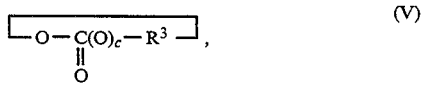

in which c and R$^3$ are as defined above, in the presence of a catalyst (3) which promotes the addition of Si-bonded hydrogen to an aliphatic multiple bond, and of a ring-opening catalyst (5).

The organic compounds (1) employed in the process are commercially available products or are prepared by methods which are customary in organic chemistry. For example, organic compound (1) where v+w is greater than 0 is preferably prepared by reacting a hydroxyalkyne compound of the formula

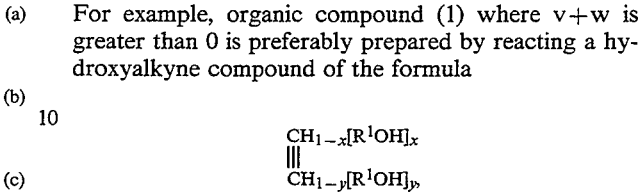

in which R$^1$ x and y are as defined above, with alkylene oxide in the presence of an electrophilic catalyst.

As the organopolysiloxane (2) it is preferred to employ one comprising units R$_3$SiO$_{1/2}$, R$_2$SiO$_{2/2}$, RHSiO$_{2/2}$, where R is as defined above.

The viscosity of the organopolysiloxanes (2) is preferably from 1 to 10,000 mm$^2$/s, more preferably from 5 to 250 mm$^2$/s, based on a temperature of 25° C.

Preferred examples of organopolysiloxanes (2) are copolymers of trimethylsiloxane, dimethylsiloxane and methylhydridosiloxane units.

The organopolysiloxanes (2) are commercially available products or can be prepared by methods customary in silicon chemistry.

In the process the catalysts (3) may be the same catalysts which it has also been possible to use before now for promoting the addition of Si-bonded hydrogen at an aliphatic multiple bond.

The catalyst (3) is preferably a metal from the group of platinum metals or a compound or a complex from the group of platinum metals.

Examples of such catalysts are metallic and finely divided platinum, which may be present on supports such as silica, alumina or activated carbon, compounds or complexes of platinum, such as platinum halides PtCl$_4$, H$_2$PtCl$_6$.6H$_2$O, Na$_2$PtCl$_4$.4H$_2$O, platinumolefin complexes, platinum-alcohol complexes, platinum-alcoholate complexes, platinum-ether complexes, platinum-aldehyde complexes and platinum-ketone complexes, including reaction products of H$_2$PtCl$_6$.6H$_2$O and cyclohexanone, platinum-vinylsiloxane complexes, such as platinum-1,3-divinyl-1,1,3,3-tetramethyldisiloxane complexes with or without a content of detectable inorganically bonded halogen, dicyclopentadienylplatinum dichloride and reaction products of platinum tetrachloride with olefins.

The catalyst (3) is preferably employed in quantities of from 1 to 1,000 ppm by weight (parts by weight per million parts by weight), more preferably in quantities of from 5 to 50 ppm by weight, calculated as elemental platinum metal and based on the overall weight of organic compound (1) and organopolysiloxane (2).

Organic compound (1) is preferably employed in quantities of from 1.03 to 1.10 mol per gram atom of Si-bonded hydrogen in the organopolysiloxane (2).

The cyclic esters (4) are preferably ε-caprolactone, δ-valerolactone, γ-butyrolactone, ethylene carbonate and propylene carbonate, ε-caprolactone being more preferred.

Cyclic ester (4) is preferably employed in quantities of from 1.0 to 5.0 mol per mol of hydroxyl groups bonded via Si-C.

The catalyst (5) may be any of the catalysts known which have been used for ring opening of cyclic ester, it being preferably to employ a medium-strength Lewis acid which is soluble in organic mixtures.

Catalyst (5) is preferably a tin compound such as di-n-butyltin octoate, di-n-butyltin acetate or di-n-butyltin dimethoxide, a titanium compound such as tetraethyl titanate tetraisopropyl titanate or tetra-n-butyl titanate, tetra-n-butyl titanate being more preferred.

The catalyst (5) is preferably employed in quantities of from 50 to 5,000 ppm by weight, preferably in quantities of from 200 to 1,000 ppm by weight, based on the total weight of the overall reaction composition.

The process is preferably carried out at the pressure of the surrounding atmosphere, at approximately from 900 to 1100 hPa, and at a temperature of preferably from 80° C. to 180° C., more preferably from 120° C. to 150° C.

In the preferred embodiments of the process the reaction is carried out in steps.

Process (a)

The invention relates to a process for the preparation of organopolysiloxanes which contain ester groups, which comprises in a 1st stage reacting organic compound (1) with organopolysiloxane (2) in the presence of a catalyst (3) which promotes the addition of Si-bonded hydrogen at an aliphatic multiple bond, and in a second stage reacting the addition product obtained in the first stage with cyclic ester (4) in the presence of ring-opening catalyst (5).

If in process (a) an organic compound (1) of formula (III) where $x+y$ is 1 is employed, then in the reaction with organopolysiloxane (2) the isomeric radicals $-CH=CH[R^1OH]$ and

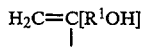

are formed.

The 1st stage of process (a) is preferably carried out at the pressure of the surrounding atmosphere, approximately at from 900 to 1100 hPa, and at a temperature of preferably from 80° C. to 140° C., more preferably from 110° C. to 140° C.

The 2nd stag of the process (a) is preferably carried out at the pressure of the surrounding atmosphere, approximately at from 900 to 1100 hPa, and at a temperature of preferably from 80° C. to 180° C., more preferably from 120° C. to 150° C.

Furthermore, it is possible first to react compound (1) with the cyclic ester and then to allow the reaction product to react with the organopolysiloxane (2). This variant is more preferred when ring-opening catalysts are used which have little or no compatibility with organopolysiloxane (2). This variant is more preferred when ring-opening catalysts are used which have little or no compatibility with organopolysiloxanes.

Process (b)

The invention relates to a process for the preparation of organopolysiloxanes which contain ester groups, which comprise in a 1st stage reacting organic compound (1) with cyclic ester (4) in the presence of ring-opening catalyst (5) and in a 2nd stage reacting the reaction product obtained in the 1st stage with organopolysiloxane (2) in the presence of a catalyst (3) which promotes the addition of Si-bonded hydrogen at an aliphatic multiple bond.

If in the 1st stage of process (b) organic compound (1) of formula (III) where $x+y$ is 1 is employed, the reaction product obtained in the 1st stage with organopolysiloxane (2) produces the following isomeric radicals A

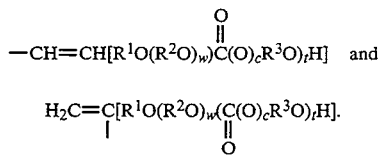

The 1st stage of process (b) is preferably carried out at the pressure of the surrounding atmosphere, approximately from 900 to 1100 hPa, and at a temperature of preferably from 80° C. to 180° C., more preferably from 120° C. to 150° C.

The 2nd stage of process (b) is preferably carried out at the pressure of the surrounding atmosphere, approximately from 900 to 1100 hPa, and at a temperature of preferably from 80° C. to 140° C., more preferably from 110° C. to 140° C.

In the process it is also possible to employ other substances such as organic solvents. In instances of incompatibility of the starting substances, these organic solvents have the function of compatibilizers.

In the process, both in the one-stage variant and in the two-stage variants, the use of organic solvent is preferred. It is preferred to carry out both stages of the two-stage processes (a) and (b) in the presence of organic solvent.

The organic solvents are preferably organic solvents of medium polarity with a boiling point of more than 100° C. at the pressure of the surrounding atmosphere, these solvents giving clear mixtures with the reaction components separately at above 80° C. in weight ratios of at least 1:1.

Examples of such solvents are ketones such as pentan-3-one, cyclohexanone, 3,3,5-trimethylcyclohexanone and isophorone, and ethers such as dioxane, diethylene glycol diethyl ether, triethylene glycol dimethyl ether and polyethylene glycol dimethyl ether, in which context cyclohexanone and isophorone are more preferred.

If organic solvent is employed, it is employed in quantities of preferably from 10% to 50% by weight, more preferably from 10% to 30% by weight, based on the total weight of the reaction composition.

In order to isolate the pure organopolysiloxanes containing ester groups, the organic solvent optionally used is preferably removed by distillation in vacuo at a temperature of about 140° C.

The organopolysiloxanes containing ester groups have the advantage that they do not possess any detectable quantities of Si-O-C linkages, rendering them stable to hydrolysis and in terms of viscosity. Moreover, the organopolysiloxanes containing radicals A of the formula (II) where $x=y=1$ has the advantage that they possess a very high concentration of ester side groups per silicon atom.

The process has the advantage that, as a result of the hydrosilylation step at the carbon-carbon triple bond, there is no reaction with free OH groups, for instance the elimination of hydrogen. Therefore the products of the 1st stage of process (a) can be reacted further directly with cyclic esters, in a one-pot process if desired. This secondary reaction is just as unlikely to occur in process (b) in the 2nd stage, provided a molar ratio $C=C:Si-H \geq 1.03$ is maintained.

The organopolysiloxanes containing ester groups can be employed as antifoam agents in nonpolar media or those of low polarity, for example fuels, crude oils or silicone oils, as leveling auxiliaries in surface coating formulations, as agents for controlling the rheology of liquids and for avoiding the formation of aerosols caused by mechanical effects on liquids, and as compatibilizers in liquids or pastes composed of organosilicon compounds and organic polymers.

In the examples described below, all references to parts and percentages are by weight unless otherwise specified. All viscosity data relates to a temperature of 25° C. (measured in a U-tube). Unless otherwise specified, the examples below were carried out at the pressure of the surrounding atmosphere of about 1,000 hPa, and at room temperature at approximately 20° C., or at a temperature which is established when the reactants are brought together at room temperature without additional heating or cooling.

Example 1

38 g of ε-caprolactone and 65 g of ethoxylated but-2-yne-1,4-diol with an average molecular weight of 184 (obtainable from BASF AG under the name Golpanol BEO) are homogeneously mixed in 71 g of 3,3,5-trimethylcyclohexanone. Under a nitrogen atmosphere, 3 mg of platinum in the form of a 1,3-divinyltetramethyldisiloxane complex, dissolved in this ligand (Karstedt catalyst) are added and the mixture is heated to 130° C. At this temperature, over the course of about 1 hour, a total of 111 g of an equilibration product of trimethylsiloxy, dimethylsiloxy and hydridomethylsiloxy units having an active hydrogen content of 0.3% and a viscosity of 50 mm$^2$/s are metered in. When, after a further hour, the reaction is complete, 400 mg of tetra-n-butyl titanate are added and in this way the ring-opening polymerization of the lactone is initiated, which comes to an end after 3 hours. The resulting organopolysiloxane which contains ester groups has a viscosity of 530 mm$^2$/s as a 75% strength solution in 3,3,5-trimethylcyclohexanone, and a silicon content of about 17% based on the pure polymer. On average, one lactone unit is grafted onto every second OH group.

Example 2

58 g of 3,3,5-trimethylcyclohexanone are mixed homogeneously with 65 g of ethoxylated but-2-yne-1,4-diol with an average molecular weight of 184 (available from BASF AG under the name Golpanol BEO). Under a nitrogen atmosphere, 3 mg of platinum in the form of the Karstedt catalyst described in Example 1 are added and the mixture is heated to 130° C. At this temperature, over the course of about 1 hour, a total of 111 g of an equilibration product of trimethylsiloxy, dimethylsiloxy and hydridomethylsiloxy units with an active hydrogen content of 0.3% and a viscosity of 50 mm$^2$/s are metered in. After an hour, when the reaction has ended, a mixture of 38 g of ε-caprolactone with 13 g of trimethylcyclohexanone and 400 mg of tetra-n-butyl titanate are added and in this way the ring-opening polymerization of the lactone is initiated, which has come to an end after 3 hours. The resulting organopolysiloxane which contains ester groups has a viscosity of 530 mm$^2$/s as a 75% strength solution in 3,3,5-trimethylcyclohexanone, and a silicon content of about 17% based on the pure polymer. On average, one lactone unit is grafted onto every second OH group.

Example 3

71 g of 3,3,5-trimethylcyclohexanone are mixed homogeneously with 65 g of ethoxylated but-2-yne-1,4-diol with an average molecular weight of 184 (available from BASF AG under the name Golpanol BEO). Under a nitrogen atmosphere, 3 mg of platinum in the form of the Karstedt catalyst described in Example 1 are added and the mixture is heated to 130° C. At this temperature for 1 hour, a total of 111 g of an equilibration product of trimethylsiloxy, dimethylsiloxy and hydridomethylsiloxy units with an active hydrogen content of 0.3% and a viscosity of 50 mm$^2$/s are metered in. When, after an additional hour, the reaction has ended, a mixture of 118 g of ε-caprolactone with 27 g of trimethylcyclohexanone and 300 mg of tetra-n-butyl titanate is added and the mixture is heated at 149° C. The ring-opening polymerization of the lactone comes to an end after 3 hours, the viscosity of the reaction mixture having reached 770 mm$^2$/s (solid content 75%). The organopolysiloxane contains 1.45 ester groups per free OH group and has a silicon content of 11% based on the pure polymer.

Example 4

43 g of but-2-yne-1,4-diol are mixed with 228 g of ε-caprolactone and 0.2 g of tetra-n-butyl titanate and the mixture is heated at 135° C. for 3 hours. The $^1$H-NMR spectrum indicates, by the absence of the signal at 2.6 ppm, the complete consumption of the lactone. This precursor contains on an average 2 ester groups per free terminal hydroxyl group. Then, as solubilizer, 140 g of cyclohexanone and, as hydrosilylation catalyst, 6 mg of platinum in the form of the Karstedt catalyst described in Example 1 are added. Subsequently, under a nitrogen atmosphere and over a period of one hour, a total of 150 g of the hydridosiloxane described in Example 1 are metered in and reaction is allowed to continue for a further 3 hours at 140° C. The resulting reaction mixture has a viscosity of 580 mm$^2$/s, and remains clear even after cooling. The polyester side chains are bonded directly to Si atoms via the but-2-ene spacer, without intermediate ethoxy groups, in a manner which is stable to hydrolysis and is such that each derivatized Si atom has two polyester side chains with an average two monomer units attached.

Example 5

43 g of ethoxylated but-2-yne-1,4-diol are mixed with 5 mg of platinum, as PtCl$_4$ dissolved in 1 ml of 1-octene, and 122 g of cyclohexanone. Under a nitrogen atmosphere at 130° C., 323 g of an α,w-dihydridopolydimethylsiloxane having a viscosity of 56 mm$^2$/s are added dropwise, the quantity of which corresponds precisely to 0.20 g of active hydrogen. After the end of the reaction, a sample of the oil freed from solvent has a viscosity of 360 mm$^2$/s. Each molecule has 2 free OH groups per chain end.

300 g of ε-caprolactone and 100 g of cyclohexanone are then added and the lactone is grafted, catalyzed by 0.8 g of tetra-n-butyl titanate, onto the free hydroxyl ends over 3 hours at 140° C. A 75% strength solution of the resulting organopolysiloxane in cyclohexanone has a viscosity of 800 mm$^2$/s. The degree of polymerization of the polyester ends is on average approximately 6.

Example 6

Under an inert gas atmosphere, 225 g of a linear equilibration product of trimethylsiloxy, hydridodimethylsiloxy and dimethylsiloxy units having a viscosity of 68 mm²/s and an active hydrogen equivalent of 2,250 g/mol of Si-H are mixed with 11 g of 2-propargyloxyethanol. At about 120° C., 5 mg of platinum in the form of the Karstedt catalyst described in Example 1 are added and the mixture is allowed to react for 4 hours, the addition of the SiH groups to the acetylenic triple bond proceeding in a virtually quantitative manner. 114 g of ε-caprolactone are then metered in, which is grafted on at 130° C. over 3 hours after the addition of 0.2 g of tetra-n-butyl titanate. After cooling to 25° C., a yellow, waxy mass is obtained, a 75% strength solution of which, in 3,3,5-trimethylcyclohexanone, has a viscosity of 1100 mm²/s. The degree of polymerization of the polyester fraction is on average 10.

Example 7

250 g of additive-free winter diesel fuel, which has an aromatic/naphthenic/paraffinic ratio (determinable in accordance with DIN 51378) of 15: 24: 61, 7.5 ppm by weight of the organopolysiloxane which contains ester groups and whose preparation is described in Example 1 are added in the form of a 10% strength solution in ethoxypropyl acetate, and the mixture is then transferred to a 500 ml pressure vessel. The pressure vessel is quickly sealed and the exit opening (diameter of the exit opening=1 mm) is centered exactly over the middle of a 500 ml measuring cylinder. In this arrangement the exit opening and the upper edge of the measuring cylinder are in one plane. Under a constant compress-air pressure of 1 bar, the diesel fuel mixture is then drained into the measuring cylinder over a period of 6 seconds, as controlled by a timer. The foam breakdown time has come to an end when all of the meniscus of the diesel fuel becomes visible. The foam breakdown time is 7 seconds.

Comparison Example 1

(A) 58 g of 3,3,5-trimethylcyclohexanone are mixed homogeneously with 65 g of ethoxylated but-2-yne-1,4-diol having an average molecular weight of 184 (available from BASF AG under the name Golpanol BEO). Under a nitrogen atmosphere, 3 mg of platinum in the form of the Karstedt catalyst described in Example 1 are added and the mixture is heated to 130° C. At this temperature, over the course of about 1 hour, a total of 111 g of an equilibration product of trimethylsiloxy, dimethylsiloxy and hydridomethylsiloxy units with an active hydrogen content of 0.3% and a viscosity of 50 mm²/s are metered in. After an addition hour, the reaction is at an end.

The procedure indicated in Example 7 is repeated, with the modification that, instead of 7.5 ppm by weight of the organopolysiloxane which contains ester groups and whose preparation is described in Example 1, 7.5 ppm by weight of the organopolysiloxane prepared above under A are employed.

The foam breakdown time is 14 seconds.

What is claimed is:

1. An organopolysiloxane which contains ester groups and comprises units of the formula

in which

R is an identical or different monovalent, SiC-bonded hydrocarbon radical having 1 to 18 carbon atoms, A is an identical or different radical of the formula

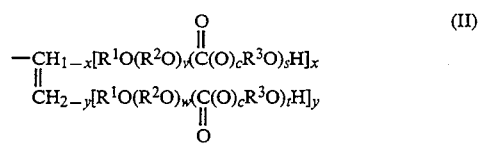

in which $R^1$ is an identical or different divalent hydrocarbon radical having 1 to 6 carbon atoms, $R^2$ is an identical or different divalent hydrocarbon radical having 2 to 4 carbon atoms, $R^3$ is an identical or different divalent hydrocarbon radical having 2 to 6 carbon atoms, c is 0 or 1, v is 0 or an integer, w is 0 or an integer, the sum of v and w being 0 or an integer from 1 to 16, s is 0 or an integer, t is 0 or an integer, the sum of s and t being an integer from 1 to 20, x is 0 or 1, y is 0 or 1, the sum of x and y being 1 or 2, a is 0, 1, 2 or 3, and b is 0, 1 or 2, with the proviso that the sum of a and b is less than or equal to 3 and the organopolysiloxane contains at least one radical A per molecule.

2. An organopolysiloxane which contains ester groups as claimed in claim 1, wherein the sum of x and y is 2.

3. An organopolysiloxane which contains ester groups as claimed in claim 1, where c is 0.

4. A method of defoaming and/or degassing organic systems by adding an organopolysiloxane as claimed in claim 1.

* * * * *